US009456295B2

(12) United States Patent
Choi et al.

(10) Patent No.: US 9,456,295 B2
(45) Date of Patent: Sep. 27, 2016

(54) METHOD AND APPARATUS FOR RECEIVING CONTENT BASED ON STATUS OF TERMINAL

(71) Applicant: Samsung Electronics Co., Ltd., Suwon-si, Gyeonggi-do (KR)

(72) Inventors: Hyun-Chul Choi, Seoul (KR); Hyuk Kang, Suwon-si (KR); Hyeong-Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 14/096,535

(22) Filed: Dec. 4, 2013

(65) Prior Publication Data

US 2014/0155050 A1    Jun. 5, 2014

(30) Foreign Application Priority Data

Dec. 5, 2012    (KR) .................. 10-2012-0140272

(51) Int. Cl.
*H04W 64/00*    (2009.01)
*H04W 4/00*    (2009.01)
*H04W 4/20*    (2009.01)

(52) U.S. Cl.
CPC ............. *H04W 4/008* (2013.01); *H04W 4/206* (2013.01)

(58) Field of Classification Search
CPC .......... H04W 64/00; G01S 1/68; G01S 5/02; G08C 17/02; H05B 33/0803
USPC ....................................... 455/418, 41.2, 434
See application file for complete search history.

(56) References Cited

U.S. PATENT DOCUMENTS

| | | | |
|---|---|---|---|
| 2005/0129042 A1* | 6/2005 | Muhonen et al. | 370/412 |
| 2005/0275528 A1* | 12/2005 | Kates | 340/539.22 |
| 2007/0243928 A1* | 10/2007 | Iddings | 463/26 |
| 2008/0109302 A1 | 5/2008 | Salokannel et al. | |
| 2008/0248815 A1 | 10/2008 | Busch | |
| 2010/0241529 A1* | 9/2010 | Kim | G06Q 20/32 705/26.1 |
| 2010/0280904 A1 | 11/2010 | Ahuja | |
| 2010/0317289 A1* | 12/2010 | Desai et al. | 455/41.2 |
| 2011/0153818 A1* | 6/2011 | Vandwalle et al. | 709/224 |
| 2012/0123633 A1* | 5/2012 | Uyeki et al. | 701/33.2 |
| 2012/0200411 A1 | 8/2012 | Best | |
| 2012/0257561 A1 | 10/2012 | Redding | |
| 2013/0297704 A1* | 11/2013 | Alberth et al. | 709/205 |

FOREIGN PATENT DOCUMENTS

EP    2 509 343 A2    10/2012

* cited by examiner

*Primary Examiner* — William Nealon
(74) *Attorney, Agent, or Firm* — Jefferson IP Law, LLP

(57) ABSTRACT

A terminal status-based content receiving method and an apparatus that receives a differential content based on a change in a status of a terminal are provided. The content receiving apparatus includes a low-power short range communication unit, and a controller configured to determine a status of the terminal, to include status information of the terminal in an advertising packet so as to periodically broadcast the advertising packet through the low-power short range communication unit, and to receive content corresponding to the status of the terminal from an external device that scans the advertising packet.

20 Claims, 8 Drawing Sheets

METHOD AND APPARATUS FOR RECEIVING CONTENT BASED ON STATUS OF TERMINAL

PRIORITY

This application claims the benefit under 35 U.S.C. §119(a) of a Korean patent application filed on Dec. 5, 2012 in the Korean Intellectual Property Office and assigned Serial No. 10-2012-0140272, the entire disclosure of which is hereby incorporated by reference.

BACKGROUND OF THE INVENTION

1. Field of the Invention

The present invention relates to a terminal status-based content receiving method and apparatus. More particularly, the present invention relates to a terminal status-based content receiving method and apparatus that receives a differential content based on a change in a status of a terminal.

2. Description of the Related Art

As an example of a location-based service providing technology using a short-range network, there is an invention using a WiFi Access Point (AP). In such a short-range network using a WiFi AP, a packet of a beacon broadcasted by the AP may include information associated with a store or other information.

Therefore, when a user of a terminal that provides a WiFi service performs scanning in a corresponding area, the user of the terminal may recognize which store (area) in which the user is located based on the information associated with the store provided by the AP, and may be provided with an appropriate service, through the method.

However, the terminal is required to continuously perform scanning to seamlessly recognize information associated with a predetermined store or area, while the AP continuously broadcasts the information associated with the predetermined store or area.

Due to a feature of a network that provides a connection based on a Peer-to-Peer (P2P) scheme, the scanning operation consumes a greater amount of current than a broadcasting operation and thus, there may be few cases in which a user actually performs the scenario.

When the terminal enters a predetermined store or area, it is useful that the entry is recognized and the user is provided with an appropriate service. However, a status of the terminal may vary in the corresponding area. Therefore, the user may be provided with only the same service irrespective of the change in the status of the terminal when the terminal enters the predetermined store or area.

Therefore, there is need for a terminal status-based content receiving method and apparatus that receives a differential content based on a change in a status of a terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a terminal status-based content receiving method and apparatus that receives a differential content based on a change in a status of a terminal.

Another aspect of the present invention is to provide a terminal status-based content receiving method and apparatus that receives a differential content corresponding to a change in a status of a terminal by broadcasting an advertising packet including information associated with the change in the status of the terminal, for an extended time.

In accordance with an aspect of the present invention, a terminal status-based content receiving apparatus is provided. The apparatus includes a low-power short range communication unit, and a controller configured to determine a status of the terminal, to include status information of the terminal in an advertising packet so as to periodically broadcast the advertising packet through the low-power short range communication unit, and to receive content corresponding to the status of the terminal from an external device that scans the advertising packet.

In accordance with another aspect of the present invention, a terminal status-based content receiving method is provided. The method includes determining a status of the terminal, including status information of the terminal in an advertising packet, periodically broadcasting the advertising packet including the status information of the terminal through a low-power short range communication unit, and displaying received content when the content corresponding to the status of the terminal is received from an external device that scans the advertising packet.

According to an exemplary embodiment of the present invention, a terminal status-based content receiving method and apparatus is provided and thus, an advertising packet including information associated with a change in a status of a terminal may be broadcasted for an extended time. In response, a differential content may be provided based on the change in the status of the terminal. Also, a user of the terminal may be effectively guided to make a purchase in a store and the like, and the user may perform a series of behaviors associated with the purchase either step by step or automatically. The user of the terminal may recognize that another user is near the user through broadcasting of the advertising packet, and may naturally perform an operation such as sharing information with the other user or joining a predetermined application.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal, according to an exemplary embodiment of the present invention, denotes a portable terminal or a stationary terminal. Here, the portable terminal may be a portable electronic device which is mobile, including a video phone, a portable phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer such as a Notebook, a Tablet, and the like, a digital camera, and the like. The stationary terminal may include a desktop computer, a personal computer, and the like.

Figure 1:
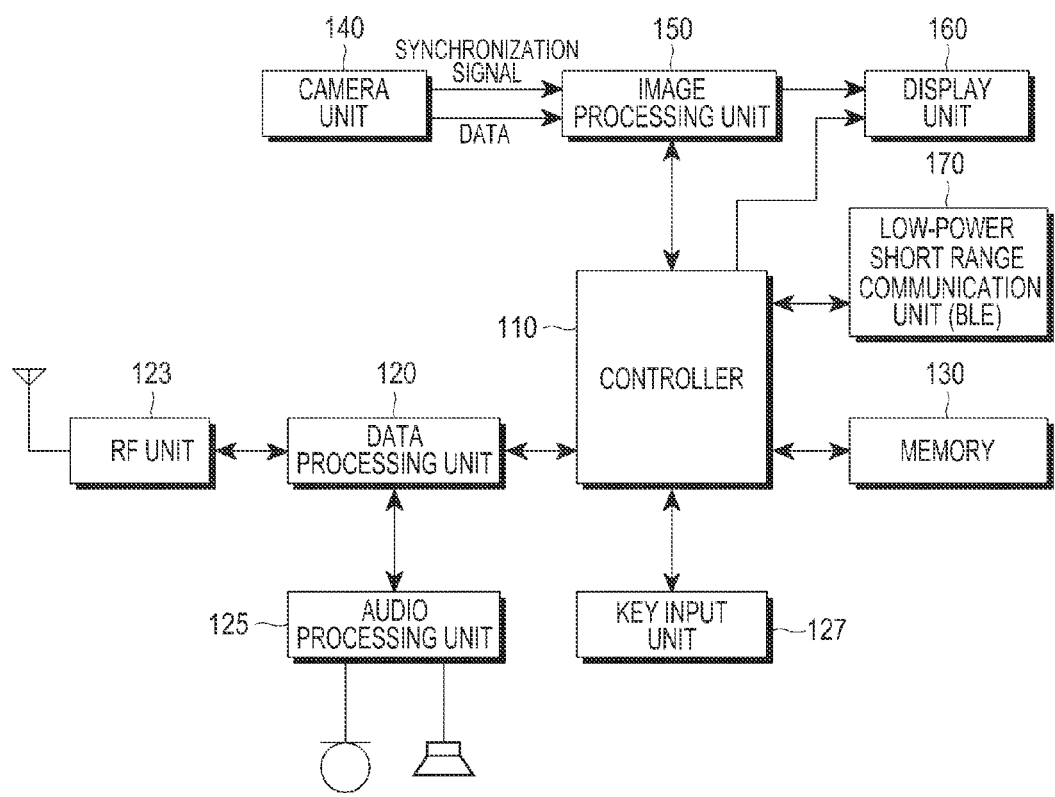
FIG. 1 is a diagram illustrating a configuration of a terminal according to an exemplary embodiment of the present invention.
Figure 2:
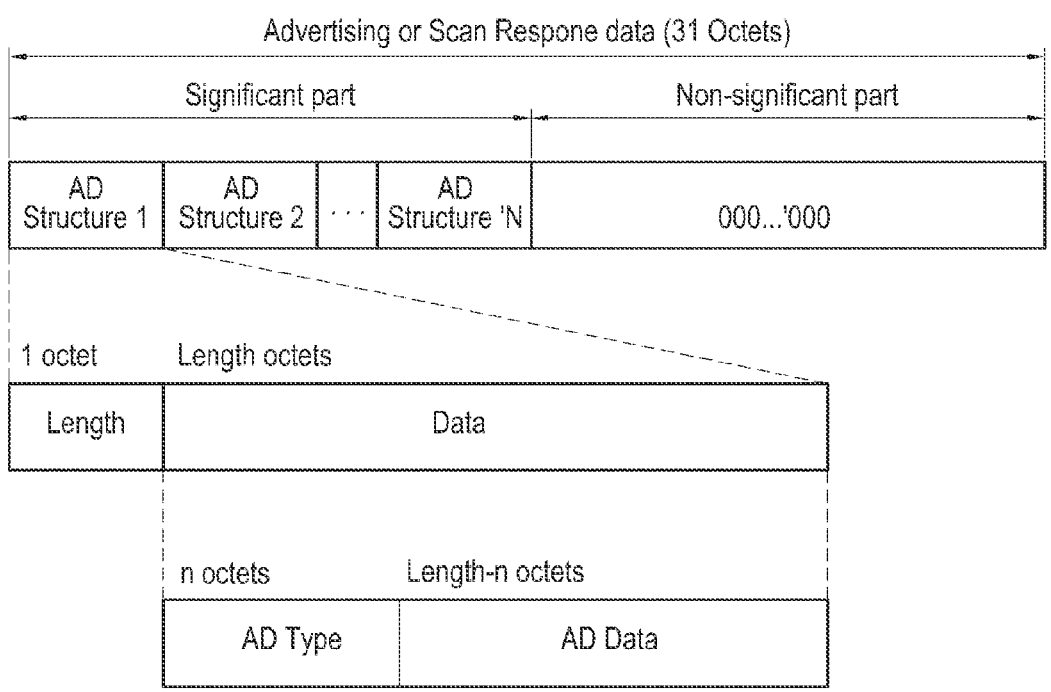
FIG. 2 is a diagram illustrating a format of an advertising package that is broadcasted by a terminal according to an exemplary embodiment of the present invention.

FIG. 1 is a diagram illustrating a configuration of a terminal according to an exemplary embodiment of the present invention, and FIG. 2 is a diagram illustrating a format of an advertising package that is broadcasted by a terminal according to an exemplary embodiment of the present invention.

Referring to FIG. 1, a Radio Frequency (RF) unit 123 performs a wireless communication function of the terminal. The RF unit 123 may include an RF transmitter to up-convert and to amplify a frequency of a transmitted signal, an RF receiver to low-noise amplify a received signal and to down-convert a frequency, and the like. A data processing unit 120 may include a transmitter to encode and modulate the transmitted signal, a receiver to demodulate and decode the received signal, and the like. That is, the data processing unit 120 may be configured having a modem and a codec. Here, the codec may be formed of a data codec to process packet data and the like and an audio codec to process an audio signal such as a voice signal and the like. An audio processing unit 125 plays back a received audio signal output from the audio codec of the data processing unit 120 or transmits a transmitted audio signal generated from a microphone to the audio codec of the data processing unit 120.

A key input unit 127 may include keys required for inputting number and character information, and function keys required for setting various functions.

A memory 130 is configured of a program memory and a data memory. The program memory stores programs for controlling general operations of a terminal. Also, the program memory may store programs for performing controlling so as to continuously broadcast an advertising package including status information of a terminal through a low-power short range communication unit, and to receive a differential content corresponding to a status of the terminal. Also, the data memory temporarily stores data generated while the programs are executed.

Also, the memory 130 stores content received from an external device that scans an advertising packet including the status information of the terminal according to an exemplary embodiment of the present invention. The external device includes Bluetooth Low Energy (BLE) corresponding to a low-power short range communication unit, and includes an Access Point (AP), a TV, a terminal, and the like.

The external device includes a low-power short range communication unit, and extracts status information of a terminal included in an advertising packet when the advertising packet is scanned through a scanning operation. The external device transmits content corresponding to the extracted status information of the terminal to the terminal by establishing a connection with the terminal through the low-power short range communication unit, and releases the connection with the terminal after transmitting the content to the terminal.

When an advertising packet of the terminal is scanned through the scanning operation after the connection with the terminal is released, the external device extracts status information of the terminal included in the advertising packet. When the extracted status information of the terminal is different from previous status information, the external device establishes a connection with the terminal through the low-power short range communication unit, and transmits content corresponding to the extracted status information of the terminal. Also, when the extracted status information of the terminal is identical to the previous status information, the external device may not transmit a connection request to the terminal.

A controller 110 controls general operations of the terminal.

The controller 110 determines a status of the terminal, and includes status information of the terminal in an advertising packet and periodically broadcasts the advertising packet through a low-power short range communication unit 170. In this example, the advertising packet refers to an advertising packet of BLE corresponding to the low-power short range communication unit 170.

FIG. 2 is a diagram illustrating a format of an advertising package that is broadcasted by a terminal according to an exemplary embodiment of the present invention.

Referring to FIG. 2, data that is essentially included in an advertising packet, such as address information of the terminal and the like, is stored in a "Significant part", and status information of the terminal according to an exemplary embodiment of the present invention is stored in a "Non-significant part".

Also, according to an exemplary embodiment of the present invention, the controller 110 determines a current status of the terminal through an output signal of a sensor included in the terminal, and stores status information of the terminal in the "Non-significant part" of the advertising packet. The terminal 110 may include sensors, such as a Global Positioning System (GPS), an accelerometer, a gyroscope, a geomagnetic pressure, and the like. Therefore, the current status of the terminal may be determined through an output signal of the sensors.

Also, the controller 110 determines at least one status of a setting status and a mode status of the terminal, for example, a silent mode, screen rotation, power saving, notification, mobile data, a driving mode, a sync mode, a privacy/flight mode, an display unit on/off status, locking/unlocking status, and execution of a predetermined application, and stores the determined status information of the terminal in the "Non-significant part".

Also, according to an exemplary embodiment of the present invention, when a connection request is received from an external device that scans an advertising packet of the terminal, the controller 110 establishes a connection with the external device through the low-power short range communication unit 170 in response to the connection request, and receives content from the connected external device and displays the received content.

Also, according to an exemplary embodiment of the present invention, the controller 110 deletes the received content when the content received from the external device is identical to previously received content.

Also, according to an exemplary embodiment of the present invention, when the content is received from the external device, the controller 110 releases the connection with the external device, again determines a current status of the terminal, and includes current status information of the terminal in the advertising packet so as to broadcast the advertising packet through the low-power short range communication unit.

Also, according to an exemplary embodiment of the present invention, when the external device corresponds to an Access Point (AP) of a predetermined store, content that is transmitted to the terminal from the AP may include at least one of a coupon, a menu, order information, and the like based on status information of the terminal included in a scanned advertising packet.

Also, according to an exemplary embodiment of the present invention, when the external device corresponds to a TV, content that is transmitted to the terminal from the TV includes at least one of booked program information, guide information for execution of a remote control application, program information, and the like based on status information of the terminal included in a scanned advertising packet.

Also, according to an exemplary embodiment of the present invention, when the external device corresponds to another terminal, content that is transmitted to the terminal from the other terminal includes at least one of a friend alert message, predetermined application information, joint request information associated with a predetermined application, and the like based on status information of the terminal included in a scanned advertising packet.

Referring again to FIG. 1, a camera unit 140 captures image data, and includes a camera sensor to convert a captured optical signal into an electric signal, and a signal processing unit to convert an analog image signal captured by the camera sensor into digital data. Here, the camera sensor may be a Charge Coupled Device (CCD) sensor or a Complementary Metal Oxide Semiconductor (CMOS) sensor, and the signal processing unit may be embodied as a Digital Signal Processor (DSP). Also, the camera sensor and the signal processing unit may be embodied as an integrated unit or as separate units.

An image processing unit 150 performs an Image Signal Processing (ISP) to display an image signal output from the camera unit 140 on a display unit 160, and the ISP performs gamma correction, interpolation, spatial change, image effect, image scaling, AWB, AE, AF, and the like. Therefore, the image processing unit 150 processes the image signal output from the camera unit 140 based on a frame unit, and outputs the frame image data based on a feature and a size of the display unit 160. Also, the image processing unit 150 includes an image codec, and compresses frame image data displayed on the display unit 160 based on a set scheme or decompresses compressed frame image data into original frame image data. Here, the image codec may correspond to a JPEG codec, an MPEG4 codec, a Wavelet codec, and the like. The image processing unit 150 is assumed to include an On Screen Display (OSD) function, and may output OSD data based on a screen size displayed based on controlling of the controller 110.

The display unit 160 displays an image signal output from the image processing unit 150 on a screen, and displays user data output from the controller 110. In an exemplary embodiment, the display unit 160 is implemented as a Liquid Crystal Display (LCD), and in this example, the display unit 160 may include an LCD controller, a memory that may store image data, an LCD display device, and the like. Here, when the LCD is embodied having a touch screen scheme, the LCD may operate as an input unit. In this example, the display unit 160 may display keys such as the key input unit 127 and the like.

Also, when the display unit 160 is embodied based on a touch screen scheme and is used as a touch screen unit, the touch screen unit is formed of a Touch Screen Panel (TSP) including a plurality of sensor panels, and the plurality of sensor panels may include a capacitive sensor panel that may recognize a hand touch and an electromagnetic sensor panel that may recognize a fine touch such as a touch of a touch pen.

The low-power short range communication unit 170 is a short range wireless communication technology that has a slow transmission speed but may reduce power consumption, and indicates BLE. In an exemplary embodiment of the present invention, the terminal may periodically broadcast an advertising packet including status information of the terminal through the BLE 170, and the terminal may be connected to the external device that scans the advertising packet and may receive a differential content corresponding to a status of the terminal through the BLE 170.

Although an exemplary embodiment of the present invention describes only the BLE as the low-power short range communication unit 170 that broadcasts an advertising packet, the terminal 110 may include Bluetooth, Zigbee, a WLAN, an ANT, and an NFC/RFID in place of or in addition to the BLE, as a short range wireless communication unit.

Exemplary content receiving operations of a terminal will be described with reference to FIGS. 3 through 8.

Figure 3:
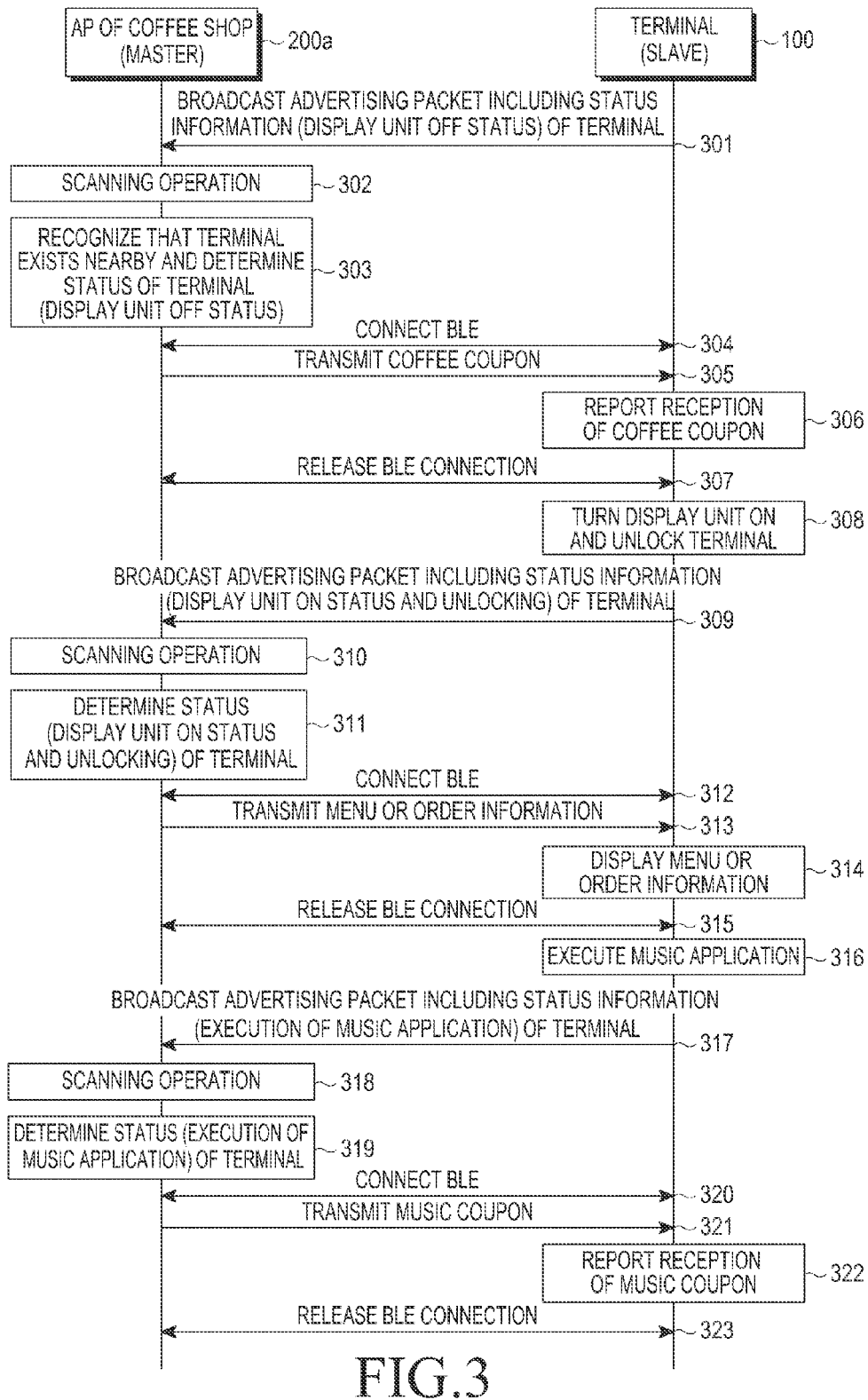
FIG. 3 is a flowchart illustrating a process in which a terminal receives content corresponding to a change in a status of the terminal according to a first exemplary embodiment of the present invention.
Figure 4:
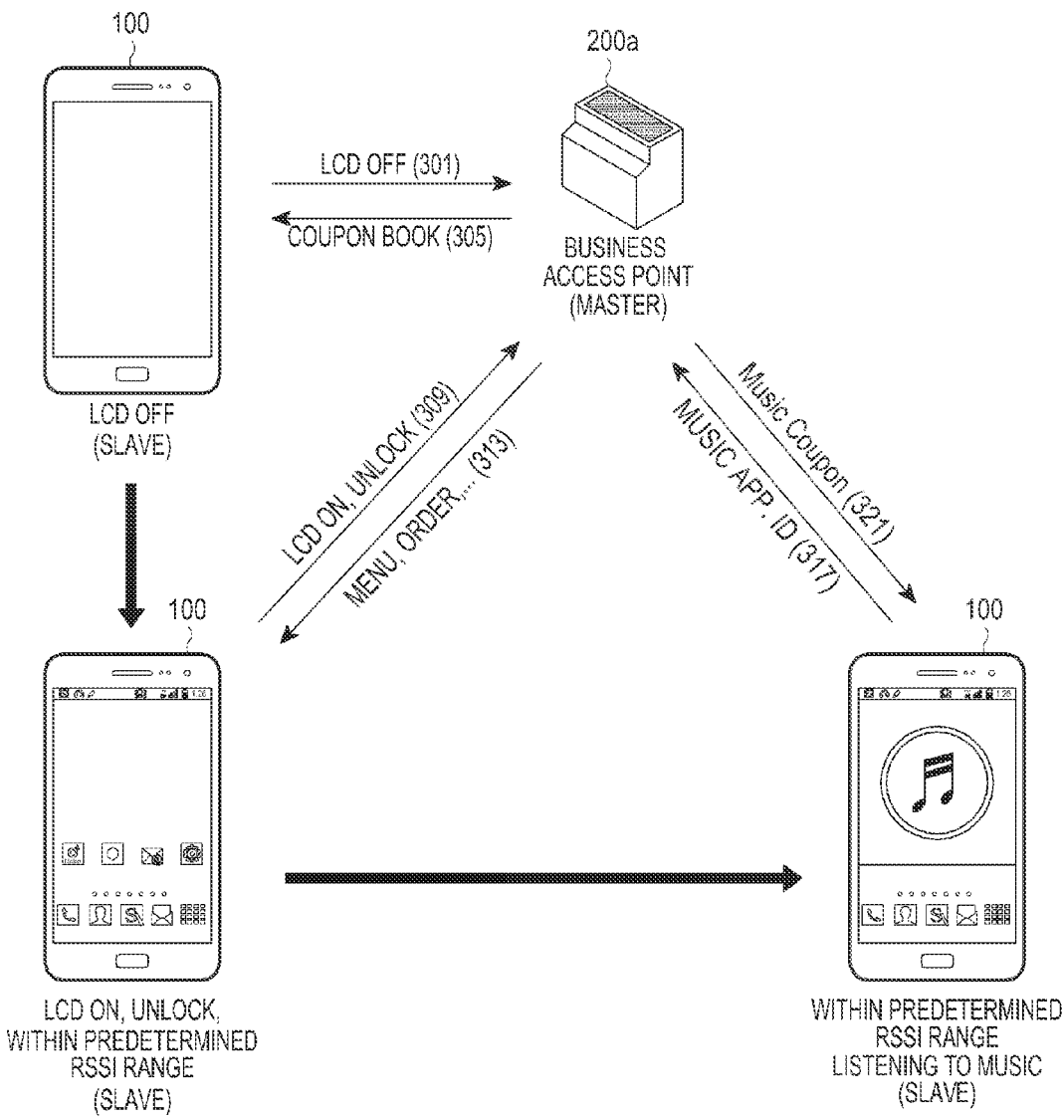
FIG. 4 is a diagram illustrating the operations of FIG. 3 according to an exemplary embodiment of the present invention.

FIG. 3 is a flowchart illustrating a process in which a terminal receives content corresponding to a change in a status of the terminal according to a first exemplary embodiment of the present invention, and FIG. 4 is a diagram illustrating the operations of FIG. 3 according to an exemplary embodiment of the present invention. In the first exemplary embodiment of the present invention, an example in which a terminal is provided with a differential content from an AP of a coffee shop including BLE based on a status of the terminal will be described.

Hereinafter, the exemplary embodiment of the present invention will be described with reference to FIGS. 1 and 2.

Referring to FIGS. 3 and 4, when a user walks around the coffee shop with a terminal 100, the controller 110 of the terminal 100 determines a current status of the terminal 100. In an exemplary implementation, the terminal 100 is currently in the user's pocket and thus the controller 110 currently determines a display unit off status of the terminal 100. Therefore, the controller 110 proceeds with step 301 that includes a display unit off status in an advertising packet as status information of the terminal 100, and broadcasts the advertising packet through the BLE 170.

When the advertising packet broadcasted from the terminal 100 is scanned while an AP 200a in the coffee shop performs a scanning operation in step 302, step 303 that recognizes that the terminal 100 exists within a predetermined range of the AP 200a is performed. In step 303, the AP 200a determines a status of the terminal 100 to be a display unit off status which indicates that the terminal 100 is not currently used, based on status information of the terminal 100 included in the advertising packet, and transmits a connection request to the terminal 100 so as to transmit a coffee coupon in case the user checks the terminal 100 now or later.

When the terminal 100 and the AP 200a are connected through BLE communication in step 304, the AP 200a proceeds with step 305 that transmits content including the coffee coupon to the terminal 100.

When the content including the coffee coupon is transmitted from the AP 200a, the controller 110 of the terminal 100 proceeds with step 306 that reports reception of the coffee coupon. When the AP 200a transmits the content including the coffee coupon to the terminal 100 and the terminal 100 receives the content including the coffee coupon, the BLE connection between the AP 200a and the terminal 100 is released in step 307.

When the user turns the display unit of the terminal 100 on and unlocks the terminal 100 so as to check the coffee coupon, through the report of the reception of the coffee coupon, in step 308, the controller 110 proceeds with step 309 that includes a display unit on status and unlocking of the terminal in the advertising packet as current status information of the terminal, and broadcasts the advertising packet.

When the advertising packet broadcasted from the terminal 100 is scanned while the AP 200a of the coffee shop performs a scanning operation in step 310, the AP 200a determines that address information of a terminal included in the advertising packet corresponds to the terminal to which the coffee coupon is transmitted within a predetermined period of time. When the AP 200a determines a status of the terminal to be a display unit on status and unlocking status which indicates that the terminal is being used based on status information of the terminal 100 included in the advertising packet in step 311, the AP 200a transmits a connection request to the terminal 100 so as to transmit menu information.

When the terminal 100 and the AP 200a are connected through BLE communication in step 312, the AP 200a proceeds with step 313 that transmits content including the menu information to the terminal 100.

When the content including the menu information is transmitted from the AP 200a, the controller 110 of the terminal 100 proceeds with step 314 that displays reception of the menu information. When the AP 200a transmits the content including the menu information to the terminal 100 and the terminal 100 receives the content including the menu information, the BLE connection between the AP 200a and the terminal 100 is released in step 315.

When a predetermined menu is selected from the menu information, the selected menu information may be included in the advertising packet as the status information of the terminal 100 and may be broadcasted, and the AP 200a scans the advertising packet and determines order information of the predetermined menu, and may be connected to the terminal 100 so as to transmit the order information to the terminal 100.

Subsequently, when the user executes a music application through the terminal 100 in step 316 after purchasing coffee, the controller 110 of the terminal 100 proceeds with step 317 that includes execution of the music application in an advertizing packet as current status information of the terminal and broadcasts the advertising packet.

When the advertising packet broadcasted from the terminal 100 is scanned while the AP 200a of the coffee shop performs a scanning operation in step 318, the AP 200a determines that address information of a terminal included in the advertising packet corresponds to the terminal 100 that purchases coffee from the coffee shop. The AP 200a determines that the terminal 100 executes the music application based on the status information of the terminal 100 included in the advertising packet in step 319, and may transmit a connection request to the terminal 100 so as to transmit an available music coupon when the music application is an application of a cooperator.

When the terminal 100 and the AP 200a are connected through BLE communication in step 320, the AP 200a proceeds with step 321 that transmits content including the music coupon to the terminal.

When the content including the music coupon is transmitted from the AP 200a, the controller 110 of the terminal 100 proceeds with step 322 that reports reception of the music coupon. When the AP 200a transmits the content including the music coupon to the terminal 100 and the terminal 100 receives the content including the music coupon, the BLE connection between the AP 200a and the terminal 100 is released in step 323.

Figure 5:
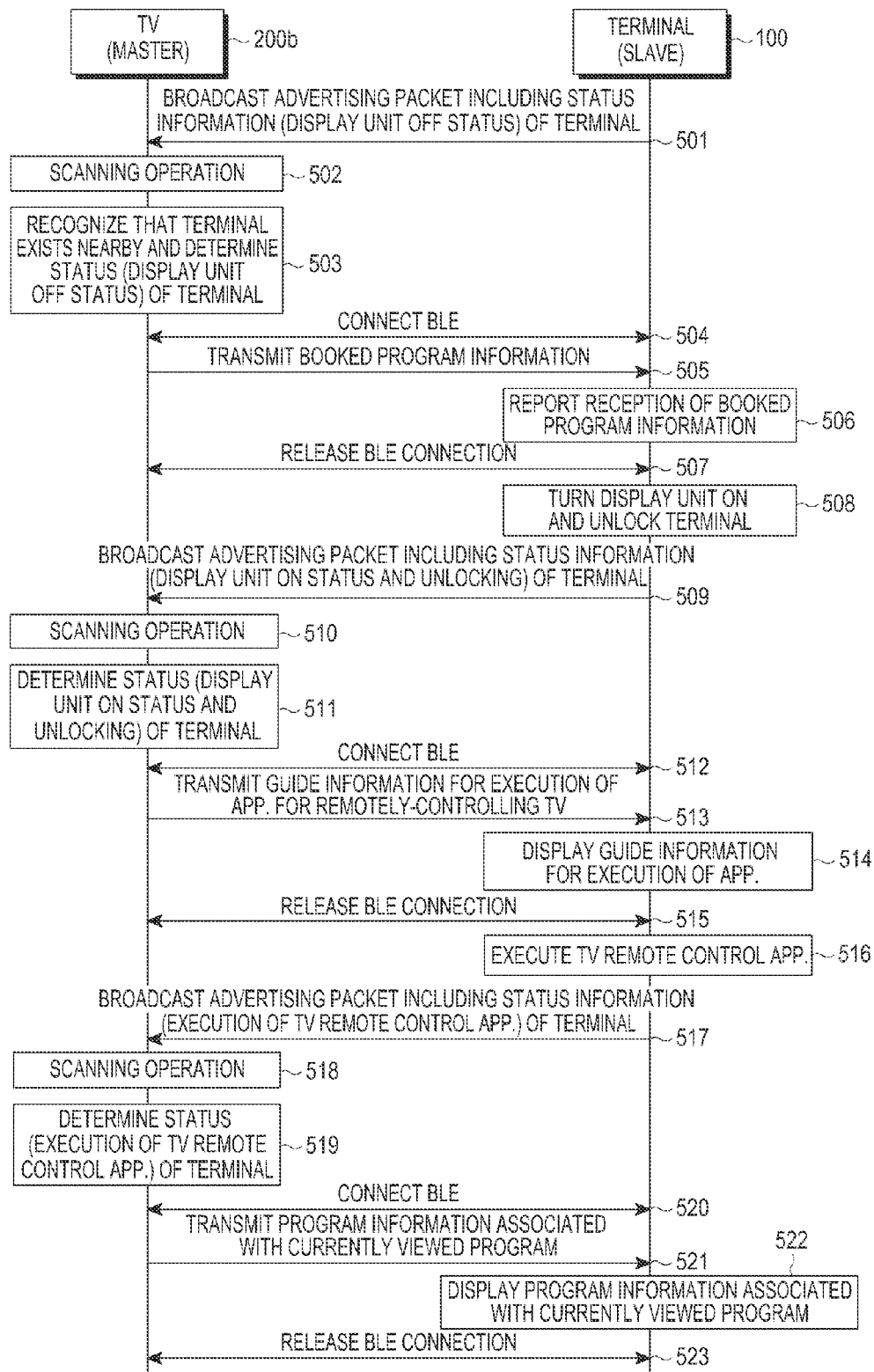
FIG. 5 is a flowchart illustrating a process in which a terminal receives content corresponding to a change in a status of the terminal according to a second exemplary embodiment of the present invention.
Figure 6:
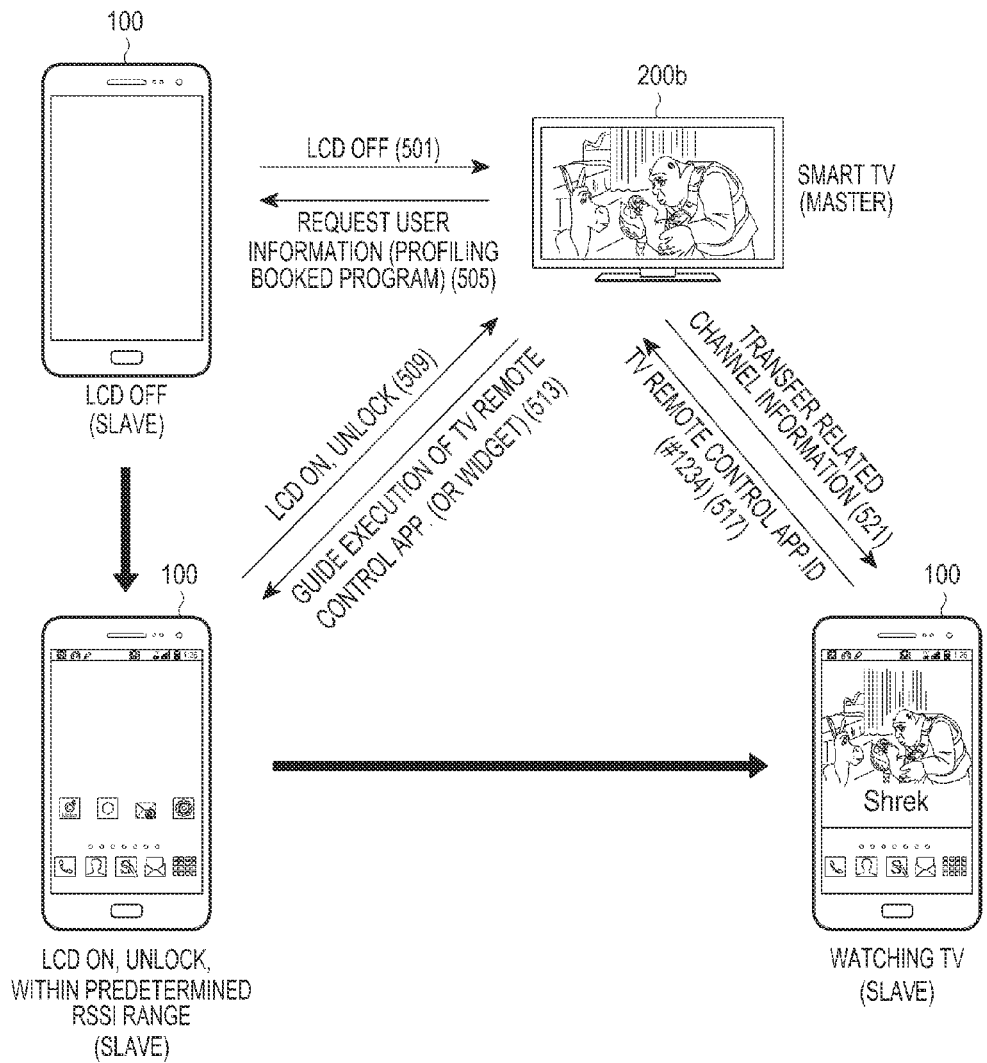
FIG. 6 is a diagram illustrating the operations of FIG. 5 according to an exemplary embodiment of the present invention.

FIG. 5 is a flowchart illustrating a process in which a terminal receives content corresponding to a change in a status of the terminal according to a second exemplary embodiment of the present invention, and FIG. 6 is a diagram illustrating the operations of FIG. 5 according to an exemplary embodiment of the present invention. In the second exemplary embodiment of the present invention, an example in which the terminal is provided with a differential content from a TV including BLE based on a status of the terminal will be described.

Hereinafter, the exemplary embodiment of the present invention will be described with reference to FIGS. 1 and 2.

Referring to FIGS. 5 and 6, when a user enters a house with the terminal 100, the controller 110 of the terminal 100 determines a current status of the terminal 100. In an exemplary implementation, the terminal 100 is currently in the user's pocket and thus, the controller 110 currently determines a display unit off status of the terminal 100. Therefore, the controller 110 proceeds with step 501 that includes a display unit off status in an advertising packet as status information of the terminal 100, and broadcasts the advertising packet through the BLE 170.

When the advertising packet broadcasted from the terminal 100 is scanned while a TV 200b performs a scanning operation in step 502, step 503 that recognizes that the terminal 100 exists within a predetermined range of the TV 200b is performed. In step 503, the TV 200b determines a status of the terminal 100 to be a display unit off status which indicates that the terminal 100 is not currently used, based on status information of the terminal 100 included in the advertising packet, and transmits a connection request to the terminal 100 to transmit booked program information stored in the TV 200b.

When the terminal 100 and the TV 200b are connected through BLE communication in step 504, the TV 200b proceeds with step 505 that transmits content including the booked program information.

When the content including the booked program information is transmitted from the TV 200b, the controller 110 of the terminal 100 proceeds with step 506 that reports reception of the booked program information. When the TV 200b transmits the content including the booked program information to the terminal 100 and the terminal 100 receives the content including the booked program information, the BLE connection between the TV 200b and the terminal 100 is released in step 507.

When the user of the terminal 100 turns the display unit of the terminal 100 on and unlocks the terminal 100 so as to check the booked program information in step 508, the controller 110 proceeds with step 509 that includes a display unit on status and unlocking of the terminal 100 in the advertising packet as current status information of the terminal 100, and broadcasts the advertising packet.

When the advertising packet broadcasted from the terminal 100 is scanned while the TV 200b performs a scanning operation in step 510, the TV 200b determines that address information of a terminal included in the advertising packet corresponds to the terminal 100 to which the booked program information is transmitted within a predetermined period of time. When the TV 200b determines a status of the terminal 100 to be a display unit on status and unlocking status which indicates that the terminal 100 is being used based on status information of the terminal 100 included in the advertising packet in step 511, the TV 200b transmits a connection request to the terminal 100 so as to transmit guide information for execution of an application that may remotely-control a TV.

When the terminal 100 and the TV 200b are connected through BLE communication in step 512, the TV 200b proceeds with step 513 that transmits content including the guide information for execution of an application that may remotely-control a TV.

When the content including the guide information for execution of the application that may remotely-control a TV is transmitted from the TV 200b, the controller 110 of the terminal 100 proceeds with step 514 that displays reception of the guide information for execution of the application that may remotely-control a TV. When the TV 200b transmits the guide information for execution of the application that may remotely-control a TV to the terminal 100 and the terminal 100 receives the guide information for execution of the application that may remotely-control a TV, the BLE connection between the TV 200b and the terminal 100 is released in step 515.

Subsequently, when the user of the terminal 100 executes the application that may remotely-control a TV and turns the TV 200b on in step 516, the controller 110 of the terminal 100 proceeds with step 517 that includes execution of the application that may remotely-control a TV in an advertising packet as current status information and broadcasts the advertising packet.

When the advertising packet broadcasted from the terminal 100 is scanned while the TV 200b performs a scanning operation in step 518, the TV 200b recognizes that the terminal 100 controls the TV 200b by executing the application that may remotely-control a TV, based on the status information of the terminal 100 included in the advertising packet in step 519, and may transmit a connection request to the terminal 100 so as to transmit program information associated with a currently viewed program.

When the terminal 100 and the TV 200b are connected through BLE communication in step 520, the TV 200b proceeds with step 521 that transmits content including the program information associated with the currently viewed program to the terminal 100.

When the content including the program information associated with the currently viewed program is transmitted from the TV 200b, the controller 110 of the terminal 100 proceeds with step 522 that reports reception of the program information associated with the currently viewed program. When the TV 200b transmits the content including the program information associated with the currently viewed program to the terminal 100 and the terminal 100 receives the content including the program information associated with the currently viewed program, the BLE connection between the TV 200b and the terminal 100 is released in step 523.

Figure 7:
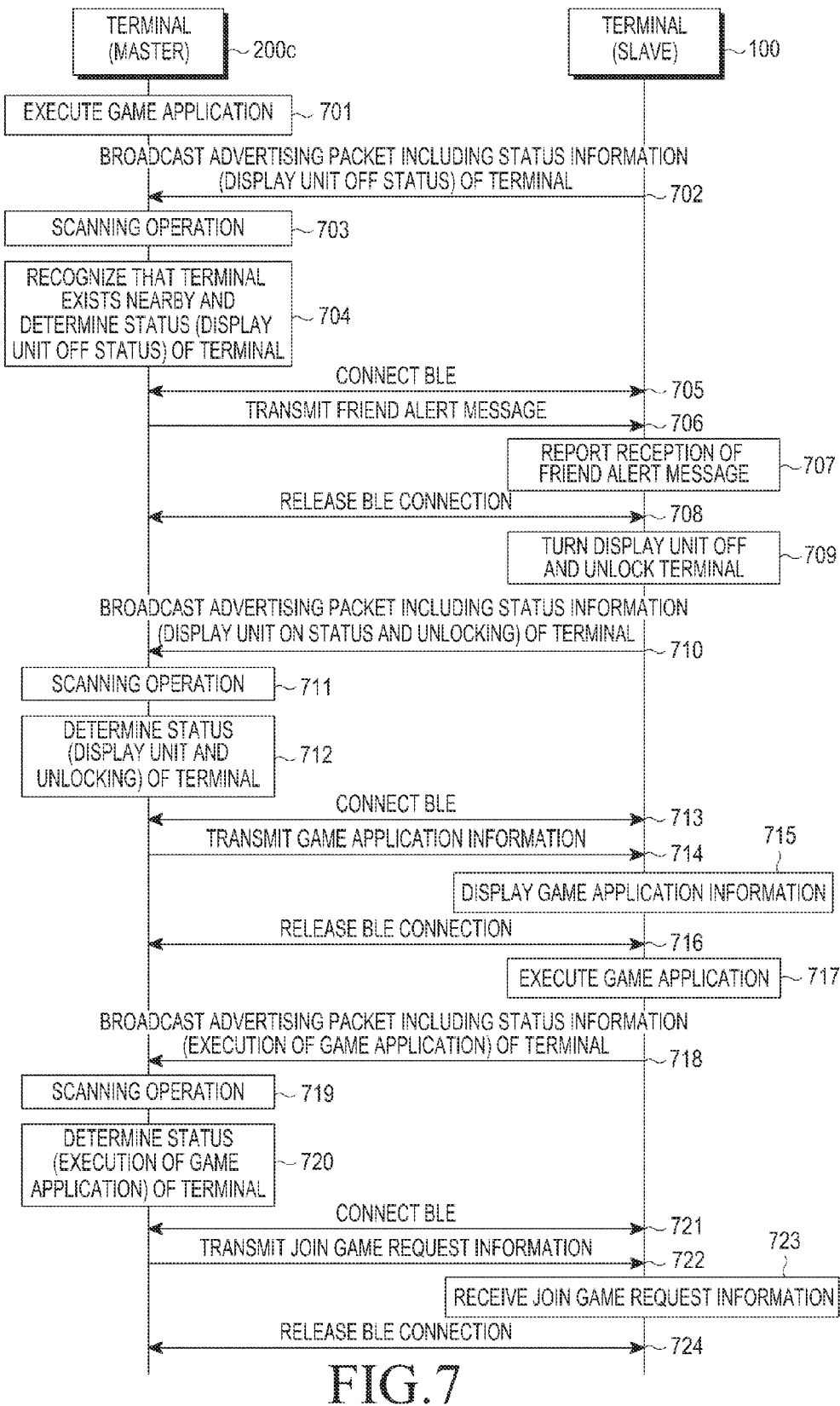
FIG. 7 is a flowchart illustrating a process in which a terminal receives content corresponding to a change in a status of the terminal according to a third exemplary embodiment of the present invention.
Figure 8:
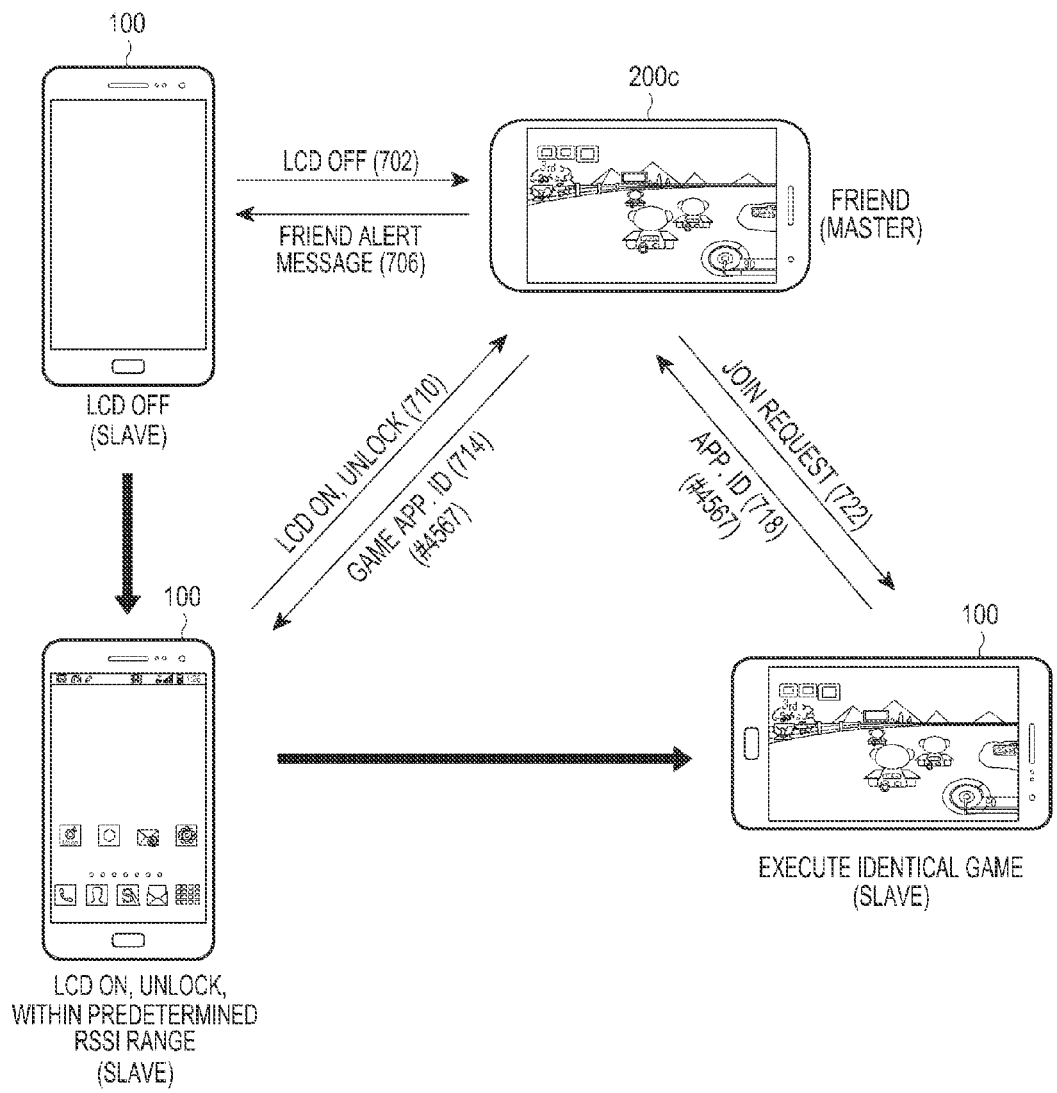
FIG. 8 is a diagram illustrating the operations of FIG. 7 according to an exemplary embodiment of the present invention.

FIG. 7 is a flowchart illustrating a process in which a terminal receives content corresponding to a change in a status of the terminal according to a third exemplary embodiment of the present invention, and FIG. 8 is a diagram illustrating the operations of FIG. 7 according to an exemplary embodiment of the present invention. In the third exemplary embodiment of the present invention, an example in which a terminal is provided with a differential content from another terminal including BLE based on a status of the terminal will be described.

Hereinafter, the exemplary embodiment of the present invention will be described with reference to FIGS. 1 and 2.

Referring to FIGS. 7 and 8, when an advertising packet including a display unit off status as status information of a terminal is broadcasted from a terminal B 100 in step 702 while a user of a terminal A 200c executes a game application in step 701, the terminal A 200c scans the advertising packet broadcasted from the terminal B 100 through a scanning operation in step 703. When the terminal A 200a determines that the terminal B 100 exists within a predetermined range and an address of the terminal B 100 corresponds to an address stored in an address book of the terminal A 200c based on address information of the terminal included in the advertising packet, the terminal A 200c proceeds with step 704 that reports that a friend exists nearby through a display unit of the terminal A 200c.

In step 704, the terminal A 200c determines a status of the terminal B to be a display unit off status which indicates that the terminal B 100 is not currently used based on status information of the terminal included in the advertising packet. When transmission of a friend alert message is selected in the terminal A 200c, the terminal A 200c transmits a connection request to the terminal B 100 so as to transmit the friend alert message.

When the terminal B 100 and the terminal A 200c are connected through BLE communication in step 705, the terminal A 200c proceeds with step 706 that transmits content including the friend alert message together with a greeting message to the terminal B 100.

When the content including the friend alert message is transmitted from the terminal A 200c, the terminal B 100 proceeds with step 707 that reports the reception of the friend alert message. The terminal A 200c transmits the content including the friend alert message to the terminal B 100, and the terminal B 100 receives the content including the friend alert message, the BLE connection between the terminal A 200c and the terminal B 100 is released in step 708.

When a user of the terminal B 100 turns a display unit of the terminal B 100 on and unlocks the terminal B so as to check the friend alert message in step 709, the terminal B 100 proceeds with step 710 that includes a display unit on status and unlocking status of the terminal in the advertising packet as current status information of the terminal, and broadcasts the advertising packet.

When the advertising packet broadcasted from the terminal A 200c is scanned while the terminal A 200c performs a scanning operation in step 711, the terminal A 200c determines that address information of the terminal included in the advertising packet corresponds to the terminal B 100 to which the friend alert message is transmitted within a predetermined period of time. When the terminal A 200b determines a status of the terminal B 100 to be a display unit on status and unlocking status which indicates that the terminal B 100 is being used, based on the status information of the terminal included in the advertising packet in step 712, the terminal A 200b transmits a connection request to the terminal B 100 so as to transmit game application information associated with a game application executed in the terminal B 200c.

When the terminal B 100 and the terminal A 200c are connected through BLE communication in step 713, the terminal A 200c proceeds with step 714 that transmits content including the game application information to the terminal B 100.

When the content including the game application information is transmitted from the terminal A 200c, the terminal B 100 proceeds with step 715 that displays the reception of the game application information.

When the terminal A 200c transmits the content including the game application information to the terminal B 100, and the terminal B 100 receives the content including the game application information, the BLE connection between the terminal A 200c and the terminal B 100 is released in step 716.

Subsequently, when the terminal B 100 immediately executes the game application since the game application received from the terminal A 200c is stored in the terminal B 100 or when the terminal B 100 executes the game application after downloading the game application since the game application received from the terminal A 200c is not stored in the terminal B 100 in step 717, the terminal B 100 proceeds with step 718 that includes execution of a game application in an advertising packet as current status information of the terminal and broadcasts the advertising packet.

When the advertising packet broadcasted from the terminal B 100 is scanned while the terminal A 200b performs a scanning operation in step 719, the terminal A 200c recognizes that the terminal B 100 executes a game application based on the status information of the terminal included in the advertizing packet in step 720, and transmits a connection request to the terminal B 100 so as to transmit join request information requesting joining of a game to the terminal B 100 that executes an identical game.

When the terminal B 100 and the terminal A 200c are connected through BLE communication in step 721, the terminal A 200c proceeds with step 722 that transmits content including the join game request information to the terminal B 100.

When the content including the join game request information is transmitted from the terminal A 200c, the terminal B 100 proceeds with step 723 that displays the join game request information. When the terminal A 200c transmits the content including the join game request information to the terminal B 100, and the terminal B 100 receives the content including the join game request information, the BLE connection between the terminal A 200c and the terminal B 200 is released in step 724.

The terminal A 200c and the terminal B 100 may include the same configuration as the configuration of the terminal of FIG. 1.

The terminal-status based content receiving method and apparatus according to exemplary embodiments of the present invention may be embodied by a computer readable recoding medium and a computer readable code. The computer readable recoding medium may include all types of recording devices that store data that can be read by a computer system. Examples of the recoding medium include a ROM, a RAM, an optical disc, a magnetic tape, a floppy disk, a hard disk, a non-volatile memory, and the like, and includes a recoding medium embodied in a form of a carrier wave (for example, transmission through the Internet). The computer readable recording medium may also dispersively store a computer readable code in a computer system connected over a network based on a dispersive scheme, and execute the stored computer readable code.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A terminal for receiving content based on a status of the terminal, the terminal comprising:
   a first low-power short range communication unit; and
   a controller configured to:
      determine a status of the terminal,
      include status information of the terminal in an advertising packet so as to periodically broadcast the advertising packet through the first low-power short range communication unit,
      establish a connection to an external device,
      receive content corresponding to the status of the terminal from the external device that scans the advertising packet, and release the connection to the external device after receiving the content at the terminal from the external device,
wherein the status information of the terminal includes at least one of a display unit off status, a display unit on status, an unlocking status, and execution of a predetermined application.

2. The terminal of claim 1, wherein the first low-power short range communication unit corresponds to Bluetooth Low Energy (BLE).

3. The terminal of claim 1, wherein the controller is configured to determine a current status of the terminal based on at least one of an output signal of a sensor included in the terminal, a setting status, and a mode status.

4. The terminal of claim 1, wherein the controller is configured to:
receive the content from the external device by establishing the connection with the external device through the first low-power short range communication unit, and
display the received content when a connection request is received from the external device.

5. The terminal of claim 1, wherein the controller is configured to delete the content when the content received from the external device is identical to previously received content.

6. The terminal of claim 1, wherein, when the content is received from the external device, the controller is configured to:
determine a current status of the terminal, and
include current status information of the terminal in the advertising packet so as to broadcast the advertising packet through the first low-power short range communication unit.

7. The terminal of claim 1, wherein the external device is configured to:
include a second low-power short range communication unit,
extract the status information of the terminal included in the advertising packet when the advertising packet is scanned through a scanning operation,
transmit content corresponding to the extracted status information of the terminal to the terminal by establishing the connection with the terminal through the second low-power short range communication unit, and
release a connection with the terminal after transmitting the content to the terminal.

8. The terminal of claim 7, wherein, when an advertising packet of the terminal is scanned through the scanning operation after the connection with the terminal is released, the external device is configured to:
extract status information of the terminal included in the advertising packet, and
establish the connection with the terminal through the second low-power short range communication unit to transmit content corresponding to the extracted status information of the terminal when the extracted status information of the terminal is different from previous status information.

9. The terminal of claim 8, wherein the external device does not transmit a connection request to the terminal when the extracted status information of the terminal is identical to the previous status information.

10. The terminal of claim 1,
wherein content transmitted to the terminal from an Access Point (AP) of a predetermined store includes at least one of a coupon, a menu, and order information when the external device corresponds to the AP,
wherein content transmitted to the terminal from a TV includes at least one of booked program information, guide information for execution of a remote control application, and program information when the external device corresponds to the TV, and
wherein content transmitted to the terminal from another terminal includes at least one of a friend alert message, predetermined application information, and joint request information associated with a predetermined application when the external device corresponds to the other terminal.

11. A method of receiving content based on a status of a terminal, the method comprising:
determining a status of the terminal;
including status information of the terminal in an advertising packet;
periodically broadcasting the advertising packet including the status information of the terminal through a first low-power short range communication unit;
establishing a connection to an external device;
displaying received content when the content corresponding to the status of the terminal is received from the external device that scans the advertising packet; and
releasing the connection to the external device after receiving the content at the terminal from the external device,
wherein the status information of the terminal includes at least one of a display unit off status, a display unit on status, an unlocking status, and execution of a predetermined application.

12. The method of claim 11, wherein the first low-power short range communication unit corresponds to Bluetooth Low Energy (BLE).

13. The method of claim 11, wherein determining the status of the terminal comprises determining the status of the terminal based on at least one of an output signal of a sensor included in the terminal, a setting status, and a mode status.

14. The method of claim 11, wherein establishing the connection to an external device comprises:
establishing the connection with the external device through the first low-power short range communication unit when a connection request is received from the external device.

15. The method of claim 14, further comprising:
determining whether the content received from the external device is identical to previously received content when the content is received from the external device; and
deleting the received content when the content received from the external device is identical to the previously received content.

16. The method of claim 11, further comprising:
wherein determining the status of the terminal comprises determining a current status of the terminal,
wherein including the status information of the terminal in an advertising packet comprises including current status information of the terminal in the advertising packet so as to broadcast the advertising packet through the first low-power short range communication unit.

17. The method of claim 11, further comprising:
extracting the status information of the terminal included in the advertising packet when the advertising packet is scanned through a scanning operation;
transmitting content corresponding to the extracted status information of the terminal to the terminal by establishing a connection with the terminal through a second low-power short range communication unit; and releasing a connection with the terminal after transmitting the content to the terminal.

18. The method of claim 17, further comprising:

extracting status information of the terminal included in an advertising packet when the advertising packet of the terminal is scanned through the scanning operation after the connection with the terminal is released;

establishing the connection with the terminal through the second low-power short range communication unit so as to transmit, to the terminal, content corresponding to the extracted status information of the terminal when the extracted status information of the terminal is different from previous status information; and releasing the connection with the terminal after transmitting the content to the terminal.

19. The method of claim 18, wherein a connection request is not transmitted to the terminal when the extracted status information of the terminal is identical to the previous status information.

20. The method of claim 11, wherein content transmitted to the terminal from an Access Point (AP) of a predetermined store includes at least one of a coupon, a menu, and order information when the external device corresponds to the AP, wherein content transmitted to the terminal from a TV includes at least one of booked program information, guide information for execution of a remote control application, and program information when the external device corresponds to the TV, and wherein content transmitted to the terminal from another terminal includes at least one of a friend alert message, predetermined application information, and joint request information associated with a predetermined application when the external device corresponds to the other terminal.

* * * * *